UNITED STATES PATENT OFFICE.

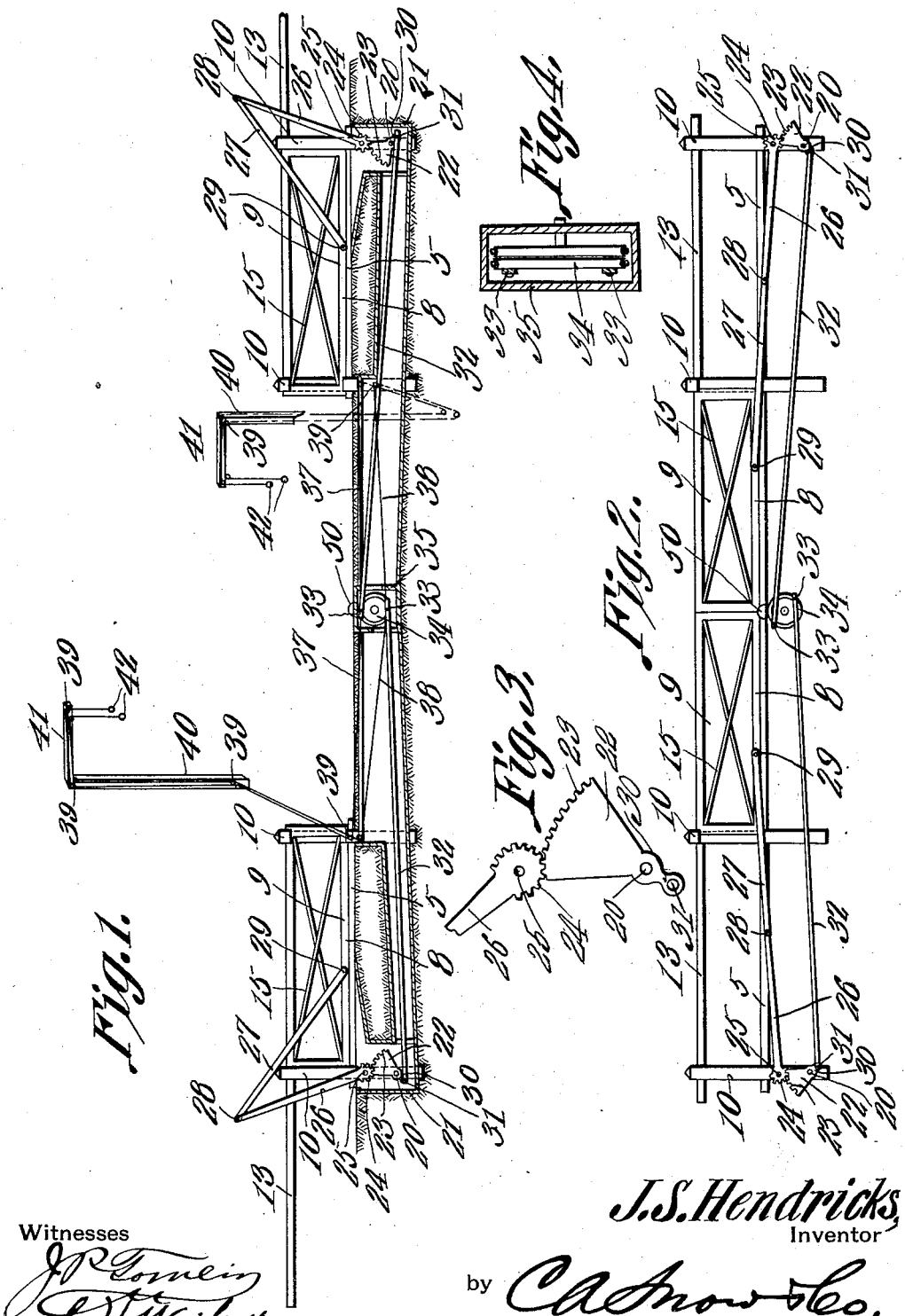

JAMES S. HENDRICKS, OF COLVILLE, WASHINGTON.

GATE.

1,024,630.

Specification of Letters Patent.

Patented Apr. 30, 1912.

Application filed May 27, 1911. Serial No. 629,771.

*To all whom it may concern:*

Be it known that I, JAMES S. HENDRICKS, a citizen of the United States, residing at Colville, in the county of Stevens and State of Washington, have invented a new and useful Gate, of which the following is a specification.

This invention relates to gates, and more especially to those that are operated by a lever; and the object of the same is primarily to utilize a toggle lever for the operating means and arrange it so that when the gate is closed the links of the toggle stand in alinement and the gate cannot be opened in any manner except by applying power directly to the toggle lever, and secondarily the object of the invention is to simplify the construction of the whole gate and its operating mechanism. These objects are accomplished by the construction described below and shown in the drawings wherein—

Figure 1 is a perspective view of this entire gate and its operating mechanism, showing the former as opened and the latter as disposed beneath the ground. Fig. 2 is a side elevation with the gate closed. Fig. 3 is a side elevation in detail showing the mechanism for operating the toggle lever. Fig. 4 is a sectional detail of the operating drum.

In the drawings 5, 5 designate mud sills, preferably arranged in pairs as seen, and carrying brackets 6 between which I journal antifriction rollers 7 at suitable intervals, so that a V-shaped track 8 in the lower edge of a wooden gate 9 can travel thereon, although if the gate be made of metal tubing connected by couplings at its corners the rollers will have grooved peripheries to accommodate themselves to the lower bar of the gate. From the extremities of the mud sills rise posts 10 each notched out as at 11 for the reception of the sills and each preferably also carrying near its top an antifriction roller 12 which engages a guide bar 13 projecting outward from the rear upper corner of the gate as seen in Figs. 1, 2. If this bar be of tubing as seen in the last named view, the face of the rollers 12 will be shaped to correspond; but otherwise the upper edge of the gate and this bar 13 may be faced with a V-shaped rail like that numbered 8 in Fig. 1, and the face of the rollers 12 will be shaped to correspond.
The gate body may consist of pickets, slats, or cross bars 15 as seen in Fig. 1; or if the gate be of metal the body may consist of netting. The size of parts is immaterial. Also it will be understood that the gate may be and preferably is built in duplicate as seen in Figs. 1 and 2, although this also is not necessary to the construction and successful operation of the whole.

The operating mechanism for this gate, if built doubly, is merely a combination of the mechanism which would be used for two single gates, using but one drum for actuating both gates. I will therefore describe the mechanism for but one of these drums. Pivoted at 20 within a casing 21 located beneath the ground is a toothed sector 22 whose teeth 23 engage others 24 formed around the pivot 25 at the outer end of one link 26 of a toggle lever whose other link 27 is pivoted to the first link at the point 28; and the outer end of the other link 27 is pivoted at 29 to the lower bar of the gate as seen. The short arm 30 of the toothed sector 22 is pivotally connected as at 31 with a rod 32 which leads beneath the ground (and is of course properly housed thereunder) to the point 33 where it is pivotally attached to a drum 34, itself mounted within a casing 35 which is set into the earth beneath the outer end of the gate when closed or beneath the center of the gateway when the gate is double. In the latter instance this mechanism will be duplicated at the other side of the gateway in a manner suggested above and which will now be clear. Leading from top and bottom of the drum are two cords or chains 37 and 38 which pass around suitable pulleys 39 (or these might be bell crank levers) and lead thence alongside the roadway to a post 40 having an arm 41 overhanging the roadway, and up the post and out its arm these cords are led over other pulleys or bell crank levers 39, to handles 42 of different shape or color or size so that they may be readily distinguished, and which hang over the roadway so as to be within easy reach of a pedestrian or an equestrian; and as these posts are duplicated at opposite sides of the gate, they are accessible to a person approaching from either way. I might say that this mechanism is duplicated whether the gate is single or double, because of course it will be desirable to open the gate from either direction, whatever the structure of the gate itself.

With the parts standing as seen in Fig. 1 and a person having passed through, he has but to pull downward on the proper handle 42 and the cord leading therefrom turns the drum 34, and the rods 32 leading from the latter to the toothed sectors 22 causes them to turn on their pivots 20 within their casing in a manner which will be clear. Their teeth engaging those on the heads of the outer links of the toggle levers, the latter are turned from the position shown in Fig. 1 to that shown in Fig. 2 and their links in straightening out will push the gate closed in a manner which will be clear. When closed the inner ends or corners of the gate may rest on a post or block 50 at the center of the roadway; but in the act of moving inward or outward these gates will travel over the rollers 7 in the mud sills, whereby their weight will be supported, their upper bars will travel beneath the hooks 51 which depend from the posts past which they slide and thereby prevent them from edgewise movement, and their guide bars 13 will travel beneath the rollers 12 in the outer posts whereby the outer corners of the gates will be held by the inner posts even after each gate has passed to a position entirely inside its said inner post as seen in Fig. 2. These guides are preferably made longer than the distance between the posts as shown in this view, so that it is permitted to make the gate shorter than such distance for the sake of cheapness and lightness; and when the gates are retracted as seen in Fig. 1 the guide rods simply slide back over or alongside the fencing and do no harm. I consider this an important feature of my invention. As the toggle lever assumes its position shown in Fig. 2, its links straighten out into alinement with each other so that the three pivotal points 25, 28 and 29 stand either in direct line or with the intermediate point a little below the other two. This practically locks the gate closed, because no one may take hold of it by hand and move it backward. It results that in order to open a gate the operating mechanism must be manipulated, and it will be understood that in order to do this it is only necessary to pull downward upon the proper handle 42, when the proper cord will turn the drum 34 in the opposite direction and this drum through the rod 32 will rock the toothed sector and cause the toggle to move from the position shown in Fig. 2 back to that shown in Fig. 1. This obviously retracts the gate from its closed to its opened position, after which the operator passes through and manipulates the handle on the other side to close the gate again, all in a manner which is well understood in this type of gates.

What is claimed is:

1. In a sliding gate, the combination with the gate and its guides, and the manipulating mechanism; of a drum moved by the latter, a toggle lever having the outer end of one link pivoted to the gate and the outer end of the other link provided with a toothed head, a toothed sector whose teeth engage those on the head, and a rod connecting the sector with the drum.

2. In a sliding gate, the combination with a gate and its guides, a tooth sector, a toggle lever having one extremity connected with the gate and the other provided with a toothed head whose teeth mesh with those of said sector, the links of this lever standing in alinement with each other when the gate is closed, and means for swinging the sector on its pivot from a remote point.

3. In a sliding gate, the combination with a gate and its guides, a tooth sector, a toggle lever having one of its extremities connected with the gate and the other extremity provided with a toothed head, whose teeth engage those on said sector, the links of this lever standing in alinement with each other when the gate is closed, a casing under the ground and a drum journaled therein, rods connecting this drum with the two sectors, and means for closing the gate.

In testimony that I claim the foregoing as my own, I have hereto affixed my signature in the presence of two witnesses.

JAMES S. HENDRICKS.

Witnesses:
C. WINSLOW,
V. G. TURK.

---

Copies of this patent may be obtained for five cents each, by addressing the "Commissioner of Patents, Washington, D. C."